United States Patent
Katayama et al.

[11] Patent Number: 6,050,511
[45] Date of Patent: Apr. 18, 2000

[54] SPINNING REEL WITH BUFFER FOR DAMPING THE RETURN FORCE OF A BAIL STRUCTURE

[75] Inventors: Masatoshi Katayama; Shuichi Matsuzawa; Muneaki Tsukihiji, all of Tokyo, Japan

[73] Assignee: Daiwa Seiko, Inc., Tokyo, Japan

[21] Appl. No.: 08/878,569

[22] Filed: Jun. 19, 1997

[30] Foreign Application Priority Data

Jun. 20, 1996 [JP] Japan ..................... 8-159727

[51] Int. Cl.⁷ ..................................... A01K 89/01
[52] U.S. Cl. .................. 242/231; 242/234; 188/267.1
[58] Field of Search ................... 242/230, 231, 242/232, 233, 234, 907; 188/267.1, 290, 293

[56] References Cited

U.S. PATENT DOCUMENTS

| | | |
|---|---|---|
| 4,095,756 | 6/1978 | Morishita . |
| 4,513,926 | 4/1985 | Tsunoda et al. .................. 242/231 |
| 5,054,593 | 10/1991 | Carlson ..................... 188/267.1 X |
| 5,170,866 | 12/1992 | Ghaem ......................... 188/267.1 |
| 5,261,628 | 11/1993 | Carlsson .......................... 242/233 |
| 5,289,990 | 3/1994 | Kawabe ............................ 242/233 |
| 5,392,884 | 2/1995 | Ojima ........................ 188/290 X |
| 5,522,485 | 6/1996 | Takahashi et al. ............ 188/290 X |
| 5,542,507 | 8/1996 | Warchocki et al. .............. 188/290 |
| 5,697,122 | 12/1997 | Okabe et al. ................ 188/293 X |
| 5,718,309 | 2/1998 | Kariya ............................. 188/290 |

FOREIGN PATENT DOCUMENTS

| | | |
|---|---|---|
| 1506359 | 3/1968 | France . |
| 55-172081 | 5/1954 | Japan . |
| 4-129767 | 11/1992 | Japan . |
| 2257004 | 1/1993 | United Kingdom ............. 242/232 |

*Primary Examiner*—Donald P. Walsh
*Assistant Examiner*—Emmanuel M. Marcelo
*Attorney, Agent, or Firm*—Sughrue, Mion, Zinn, Macpeak & Seas, PLLC

[57] ABSTRACT

In a spinning reel used for fishing including a rotor (3) rotatable in cooperation with rotation of a handle, the rotor supporting a bail supporting member (8) having a guide (10) for guiding a fishing line therewith, the bail supporting member (8) is able to swing between a fishing line winding position and a fishing line releasing position, the bail supporting member being biased by a spring member to position at each of the fishing line winding position and the fishing line releasing position. A backward return force produced when the bail supporting member returns to its prior position is absorbed and relaxed just before a return winding position at which the bail supporting member is returned from the fishing line releasing position to the fishing line winding position. An impact (noise) can be eliminated when a bail supporting member is returned from a fishing line releasing position to a fishing line winding position, and a fishing line winding position of a bail supporting member, that is, a position of a fishing line guide, can be stabilized.

32 Claims, 14 Drawing Sheets

SPINNING REEL WITH BUFFER FOR DAMPING THE RETURN FORCE OF A BAIL STRUCTURE

BACKGROUND OF THE INVENTION

The present invention relates to a spinning reel used for fishing, and more particularly to a spinning reel used for fishing having a featured bail supporting member supporting a bail.

A conventional spinning reel used for fishing includes a rotor to be rotated by and linked with a handle. A support arm of the rotor supports at a distal end thereof a bail supporting member having a bail and a fishing line guide so that said bail supporting member is movable from a fishing line winding condition to a fishing line releasing condition or vise versa. The bail supporting member is biased by a dead-point spring to be held at either of the fishing line winding condition and the fishing line releasing condition. After a fishing line is released with the bail being in a fishing line releasing condition, the bail supporting member is returned to a fishing line winding condition manually or through an automatic return mechanism driven by handle rotation.

When the bail supporting member is to be returned to its original position, an impact noise is produced by the bail supporting member regardless of the manual operation or the use of the automatic return mechanism. In order to eliminate the impact noise, Japanese Unexamined Utility Model Publications Nos. 55-172081 and 4-129767 propose a resilient member made up of a spring member which is interposed between the bail supporting member and the rotor support arm when a bail supporting member has been returned to a fishing line winding position.

However, in all of the above mentioned prior art, the backward rotation of the bail supporting member is received by the spring member which imparts a biasing force in the opposite direction at the fishing line winding position. Thus, the winding position (angle) of the bail supporting member, i.e. the position (angle) of the fishing line guide is not stable due to spring force of the spring member and spring force of the dead-point spring of the bail supporting member.

If the winding position (angle) of the bail supporting member, i.e. the position (angle) of the fishing line guide is not stable, a fishing line path is not stable either, exerting an influence on fishing line wound condition, fishing line twisting, fishing line jam, fishing line scooping-up and rotor rotation balance, and posing a problem that a function of eliminating the impact noises is not stable.

SUMMARY OF THE INVENTION

The present invention has been made by the inventors who newly found out a problem that it is not possible to stabilize a position of a bail supporting member at a fishing line winding position because there is a spring member which produces a biasing force in a direction opposite to a direction of rotation of a bail supporting member toward a fishing line winding position, that is, a biasing force in a direction opposite to a biasing force of a bias spring.

It is an object of the present invention to provide a spinning reel used for a fishing which is capable of eliminating an impact (noise) produced when a bail supporting member is rotatingly returned from a fishing line releasing position to a fishing line winding position, and stabilizing a fishing line winding position of a bail supporting member, that is, a position of a fishing line guide.

There is provided a spinning reel used for fishing including a rotor rotatable in linking with rotation of a handle, the rotor supporting a bail supporting member having a fishing line guide so that the bail supporting member is able to swing between a fishing line winding position and a fishing line releasing position, the bail supporting member being biased by a spring member held at either of the fishing line winding position and the fishing line releasing position, characterized in that the bail supporting member is engaged with a buffer means just before the bail supporting member is returned from the fishing line releasing position to the fishing line winding position, to thereby absorb and relax a backward return force produced when the bail supporting member is returned.

When the bail supporting member is returned by the spring member from the fishing line releasing position to the fishing line winding position, the backward return force exerted on the bail supporting member is absorbed in and thus relaxed by the buffer means just before the original, winding position. That is, a rotation force exerted on the bail supporting member by the dead-point spring member is absorbed and relaxed to thereby be gradually weakened, whereby a final, backwardly-returned, winding position of the bail supporting member is able to be stabilized without causing an impact (noise).

BRIEF DESCRIPTION OF THE DRAWINGS

FIG. 4 is viewed in a direction indicated with an arrow.

DETAILED DESCRIPTION OF THE PREFERRED EMBODIMENTS

Figure 1:
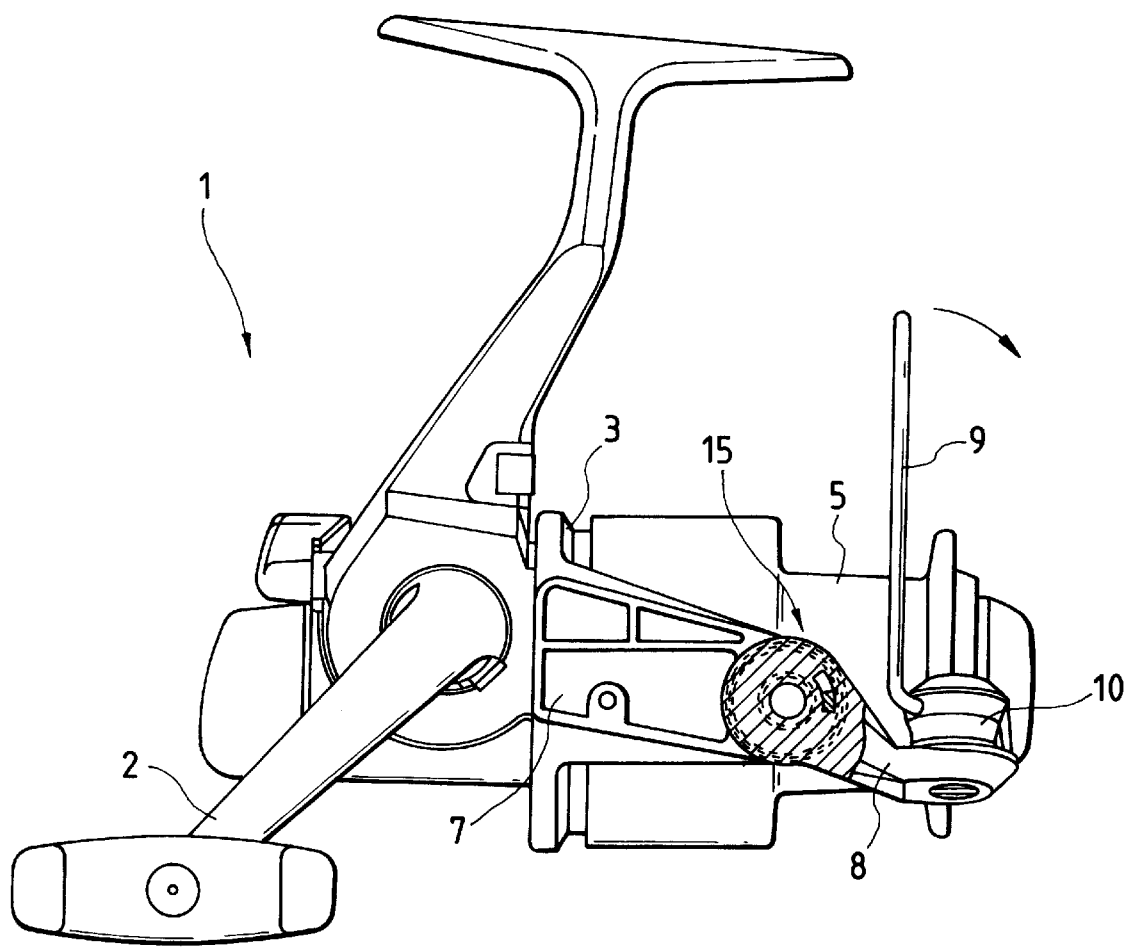
FIG. 1 is an entire view of an example of a spinning reel used for fishing.

As illustrated in FIG. 1, in a spinning reel used for fishing, by rotating a handle 2 provided on a reel main body 1, a rotor 3 is made to rotate whereas a spool 5 is made to make forward and backward movement. The rotor 3 is formed with a pair of rotor supporting arms 7 (only one of them is illustrated) which face to each other. Bail supporting members 8 (only one of them is illustrated) are supported at distal ends of the rotor supporting arms for rotational movement. A respective, base end of a bail 9 is secured to each of the bail supporting members 8, and one of the bail supporting members is provided with a fishing line guide 10, as illustrated.

The bail supporting members 8 supported at the rotor supporting arms 7 for rotational movement are held at either a fishing line winding position or a fishing line releasing position by a dead-point spring 6. A fishing line is wound uniformly around a spool 5 through the fishing line guide 10 with the bail supporting members being held at the fishing line winding position as illustrated in FIG. 1. The bail supporting members 8 are returned from the fishing line releasing position to the fishing line winding position either by manual operation by grasping the bail 9 or by a conventional automatic return mechanism which automatically returns the bail supporting members when the handle 2 is rotated.

As mentioned above, a spinning reel for fishing in accordance with the present invention is characterized by the bail supporting member 8 supporting the bail 9, and hence hereinbelow only the bail supporting member is explained without showing an entire structure of a spinning reel for fishing. That is, hereinbelow will be explained in detail the buffer means which absorbs and relaxes the backward return force, to thereby relax an impact when the bail supporting member 8 returns from a fishing line releasing position to a fishing line winding position.

Figure 2:
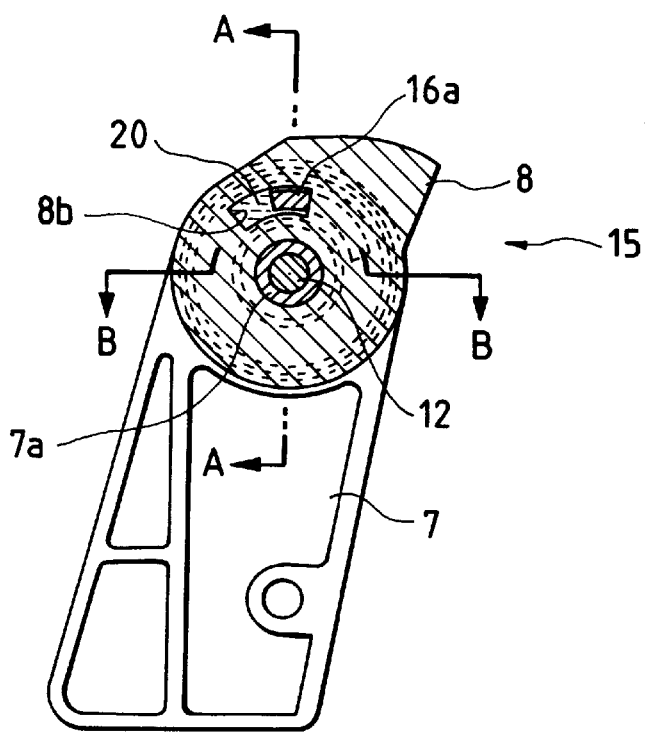
FIG. 2 is a view illustrating the first embodiment in accordance with the present invention, and illustrates that a bail supporting member supported by a rotor supporting arm is located at a fishing line winding position.
Figure 3:
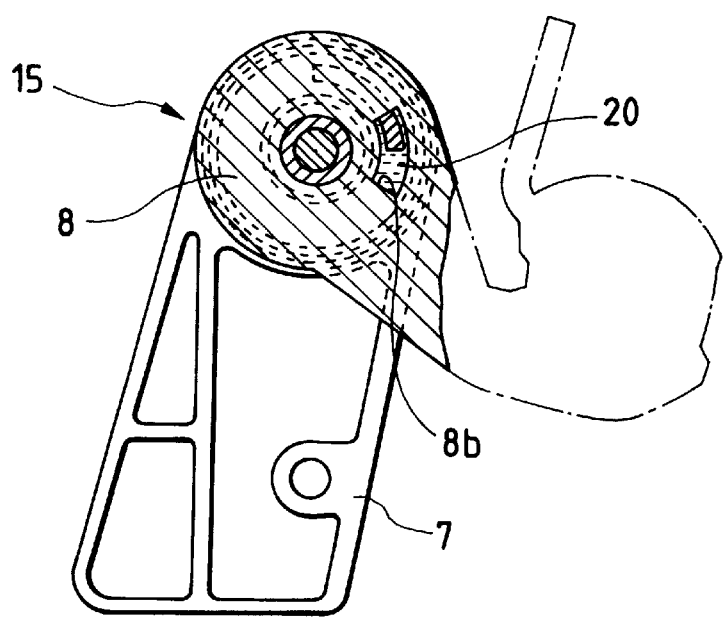
FIG. 3 is a view illustrating that a bail supporting member is located at a fishing line releasing position in a structure illustrated in FIG. 2.
Figure 4:
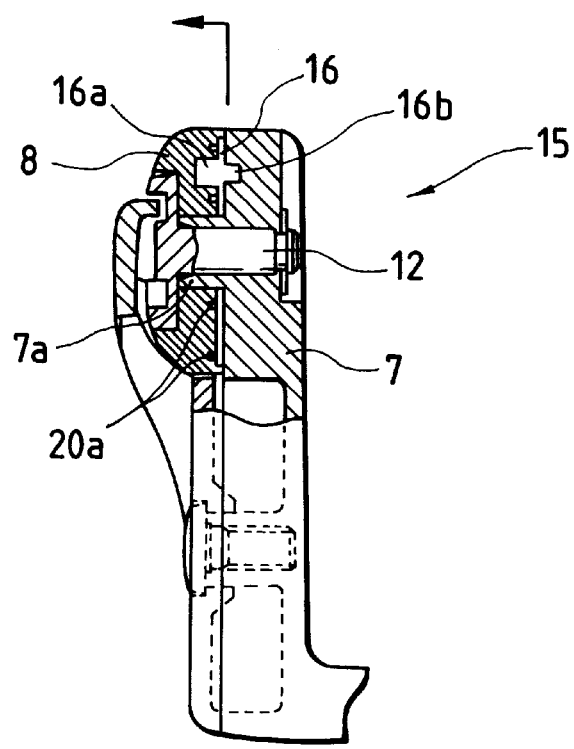
FIG. 4 is a cross-sectional view taken along the line A—A in FIG. 2.
Figure 5:
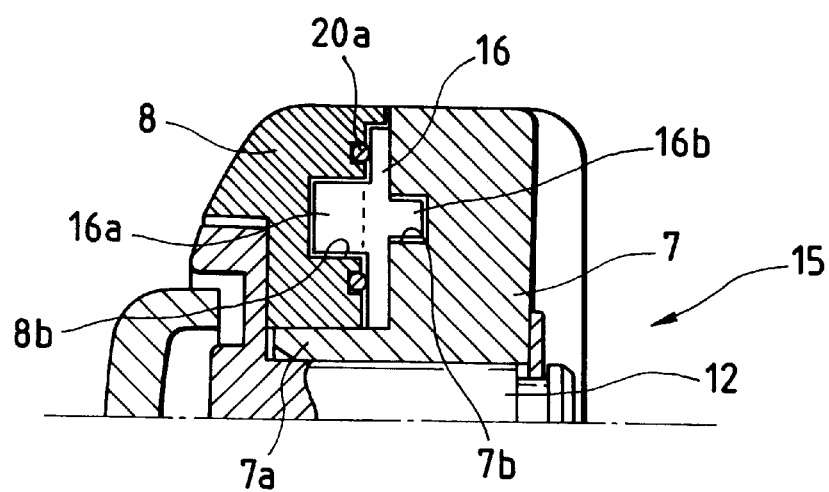
FIG. 5 is an enlarged view of a gist in FIG. 4.

FIGS. 2 to 9 illustrate the first embodiment in accordance with the present invention. As illustrated in FIGS. 2, 4 and 5, the bail supporting member 8 is rotatably supported on the rotor supporting arm 7 through a fixing pin 12 and a boss 7a formed in the-rotor supporting arm 7. The backward return force produced when the bail supporting member 8 is returned from the fishing line releasing position to the fishing line winding position is absorbed and relaxed by the buffer means 15. The buffer means 15 in the instant embodiment is disposed in the vicinity of a rotational support portion of the bail supporting member 8, as mentioned below.

Figure 6:
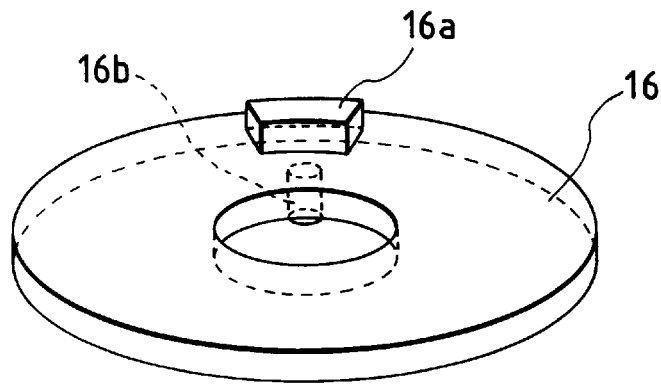
FIG. 6 is a view showing a structure of a silencer member.
Figure 7:
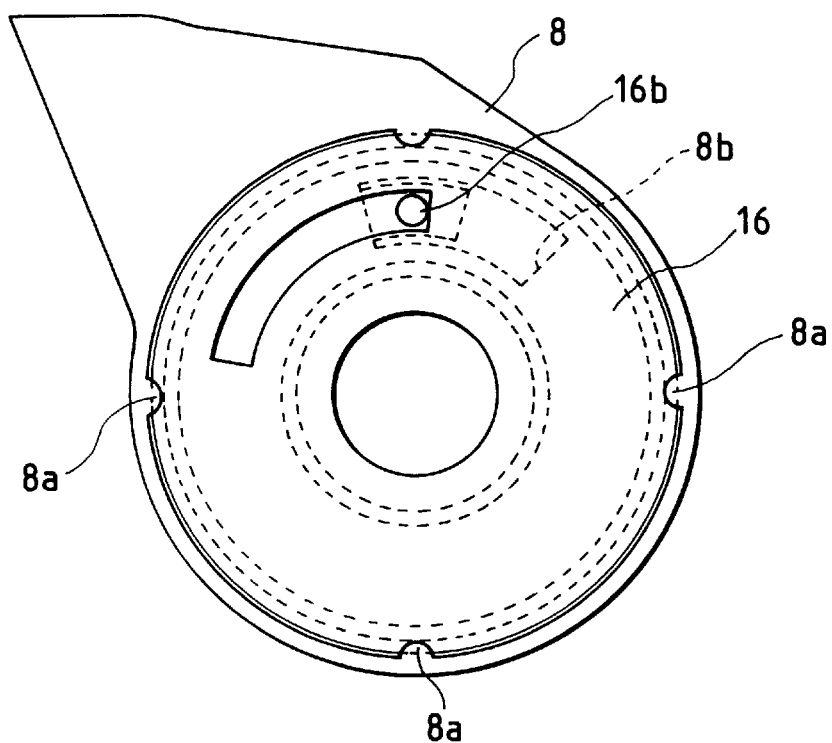
FIG. 7 is a view obtained when
Figure 8:
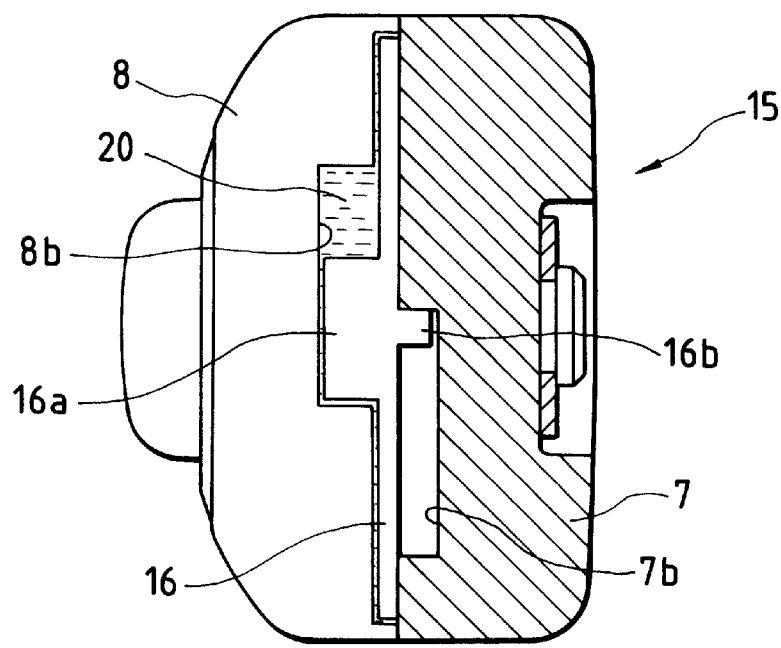
FIG. 8 is a cross-sectional view taken along the line B—B in FIG. 2.
Figure 9:
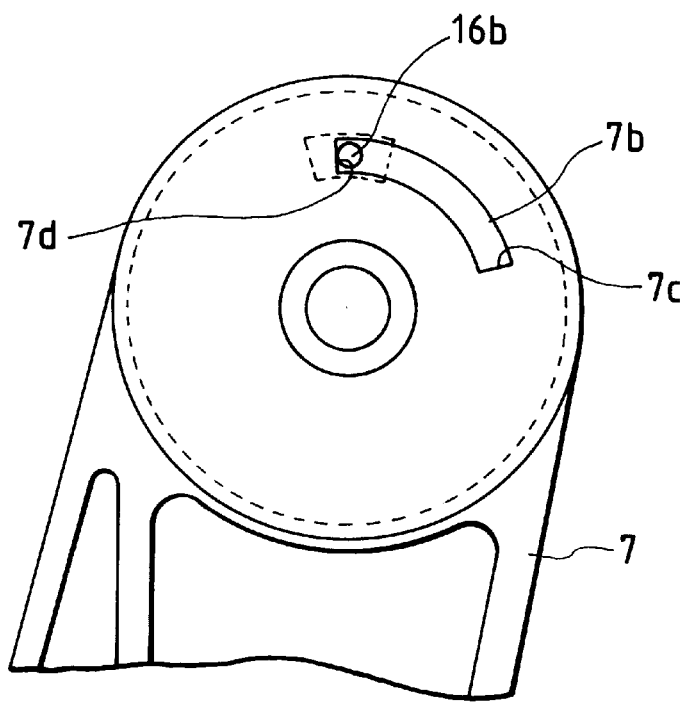
FIG. 9 is a view illustrating an engagement portion between a rotor supporting arm and a bail supporting member.

A silencer member 16 in the form of a circular plate shape as illustrated in FIG. 6 is fitted on a boss 7a, and is supported for rotational movement on an inner surface of the bail supporting member 8 (a surface facing to the rotor supporting arm) in a condition that engagement portions 8a (see FIG. 7) formed on the bail supporting member 8 prevent the silencer member from being removed therefrom. The circular plate shaped silencer member 16 is formed with an arcuate engagement projection 16a projecting towards the bail supporting member and an abutment projection 16b projecting towards the rotor supporting arm. The projection 16a is received into an arcuate recess 8b formed in an inner surface of the bail supporting member 8 (see FIGS. 3 and 5), and the abutment projection 16b is received into an arcuate engagement groove 7b formed in the rotor supporting arm 7 (see FIGS. 5, 8 and 9). An end stopper 7c and the other end stopper 7d of the engagement groove 7b respectively define a fishing line releasing position and a fishing line winding position of the bail supporting member 8 (see FIGS. 2, 3 and 9).

The arcuate recess 8b is designed to have a size enough to define a certain sized space between the projection 16a and itself. A member, preferably highly viscous fluid material 20 such as silicone grease, is sealingly filled within the space for absorbing an impact force (see FIGS. 2 and 8). For this purpose, sealing members 20a are disposed between the silencer member 16 and the bail supporting member 8 (see FIG. 5).

Hereinbelow will be explained the operation of the buffer means 15 having the above mentioned structure.

When a fishing line is to be released, the bail 9 is grasped and rotated from the fishing line winding position illustrated in FIG. 1 in a direction indicated with an arrow. With the rotation of the bail 9, the bail supporting member 8 is also rotated, and the projection 16b formed on the silencer member 16 makes abutment with the end stopper 7c formed at one end of the engagement groove 7b in the rotor supporting arm 7. Thus, the bail supporting member 8 is fixed at the fishing line releasing position illustrated in FIG. 3. With the rotation of the bail supporting member 8, the projection 16a formed on the silencer member 16 moves from the position illustrated in FIG. 2 to the position illustrated in FIG. 3. With the rotation of the bail supporting member 8, there is produced a slight resistive force between the projection 16a formed on the silencer member 16 and the highly viscous fluid material 20, however, since the rotation of the bail supporting member 8 is manually made, the resistive force does not cause a problem. The bail supporting member 8 is fixed at the fishing line releasing position by a biasing force provided by a not-illustrated dead-point spring.

Just after a fishing line has been released, the bail 9 is returned back to the fishing line winding position illustrated in FIG. 1. The return of the bail is made manually, or automatically by a conventional automatic return mechanism when the handle 2 is rotated. When the bail is returned to the fishing line winding position, the bail supporting member 8 is forcibly returned from the position illustrated in FIG. 3 to the position illustrated in FIG. 2 by a biasing force of the spring beyond its dead point. However, since the projection 16a formed on the silencer member 16 receives the resistive force from the highly viscous fluid material 20, a force with which the bail returns to the fishing line winding position is absorbed into the highly viscous fluid material. That is, the projection 16b formed on the silencer member 16 makes abutment by a biasing force of the spring with the end stopper 7d formed at the other end of the engagement groove 7b. However, since a force with which the bail supporting member returns to the position illustrated in FIG. 2 is absorbed into the buffer means as mentioned above while the bail supporting member returns to the position, no appreciable impact will be produced when the projection 16b makes abutment with the end stopper 7d.

The shape and size of the projection 16a formed on the silencer member 16, the amount and material of the fluid 20 for providing the buffering function, the size and shape of the recess 8b formed in the bail supporting member 8 and so on may be varied depending on the biasing force of the spring and the like.

As mentioned above, a force with which the bail supporting member 8 returns from the fishing line releasing position to the fishing line winding position is absorbed through the projection 16a of the silencer member 16 and the highly viscous fluid material 20, and hence an impact noise is prevented from being produced when the projection 16b abuts the end stopper 7d. The fishing line winding position of the bail supporting member 8 is defined by the projection 16b of the silencer member 16 making engagement or abutment with the end stopper 7d of the engagement groove 7b formed in the rotor supporting arm 7 with this construction the impact is absorbed in the above mentioned manner, and the fishing line winding position is kept stable. That is, since the fishing line winding position of the bail supporting member 8 is determined by the abutment with a biasing force of the a spring pressing from a constant position and fixed in the position, the fishing line guide 10 fixed to the bail supporting member 8 is also kept at a constant position. Consequently, a fishing line path becomes stable when a fishing line is to be wound. As a result, a fishing line wound condition, fishing line scooping-up and rotor rotation balance are made better, and thus occurrence of fishing line twisting and the like is counteracted.

The above mentioned buffer means can be structured as follows, for instance, as long as it can absorb and relax a return force with which the bail supporting member returns and it can stabilize a position of the bail supporting member when a fishing line is to be wound. In an embodiment explained hereinbelow, parts corresponding to the previously mentioned embodiment will be provided with the same reference numerals, and will either not be explained or explained simply.

FIGS. 10 to 14 illustrate the second embodiment in accordance with the present invention. The buffer means in the previously mentioned embodiment is disposed in the vicinity of the portion where the bail supporting member 8 is supported for rotation, whereas the buffer means 15 in the instant embodiment is disposed in an internal space of the rotor supporting arm 7.

Figure 10:
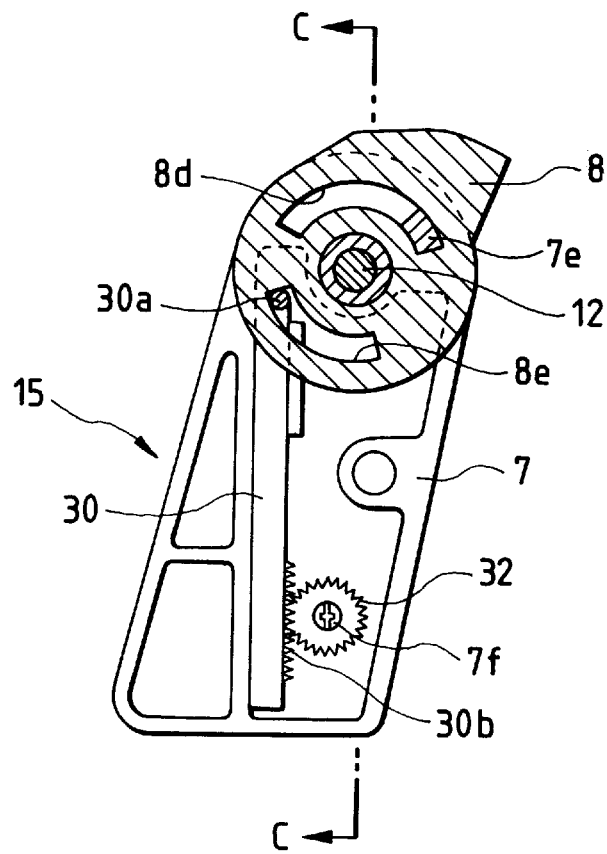
FIG. 10 is a view illustrating the second embodiment in accordance with the present invention, and illustrates that a bail supporting member supported by a rotor supporting arm is located at a fishing line winding position.
Figure 11:
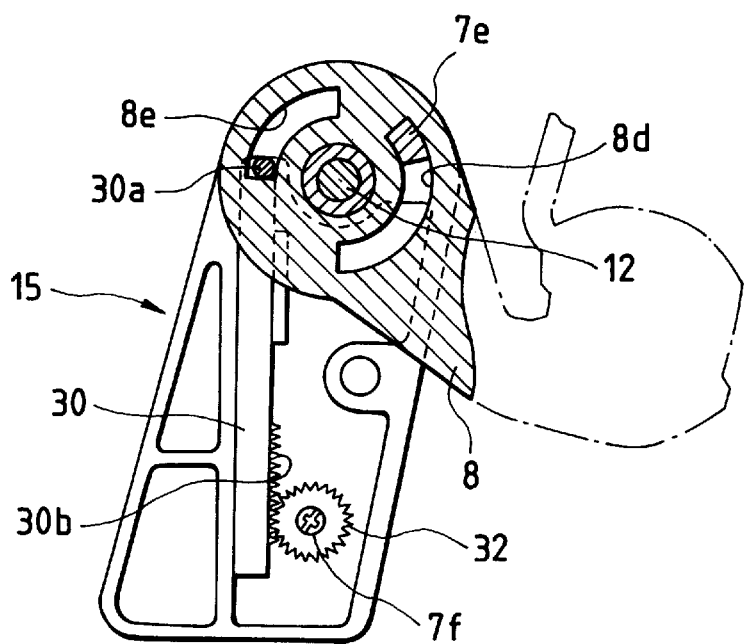
FIG. 11 is a view illustrating that a bail supporting member supported by a rotor supporting arm is located at a fishing line releasing position in a structure illustrated in FIG. 10.
Figure 12:
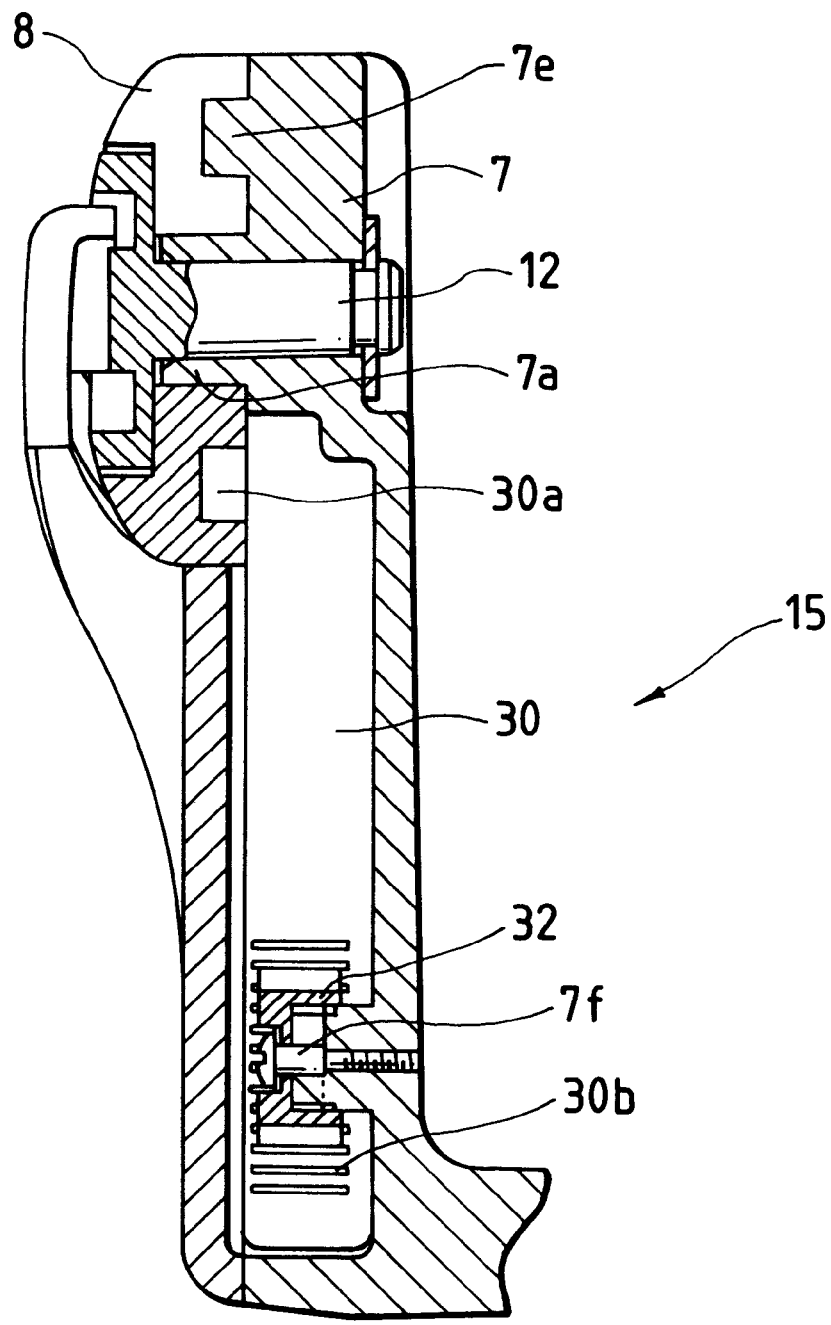
FIG. 12 is a cross-sectional view taken along the line C—C in FIG. 10.

As illustrated in FIGS. 10 to 12, the rotor supporting arm 7 is formed with a projection 7e projecting towards the bail supporting member 8. The bail supporting member 8 supported on the rotor supporting arm 7 for rotation is formed with an arcuate elongate hole 8d with which the projection 7e is engaged. The elongate hole 8d defines rotation positions of the bail supporting member 8, that is, a fishing line releasing position and a fishing line winding position of the bail supporting member 8 by the projection 7e making engagement with the elongate hole 8d at its opposite ends. The bail supporting member 8 is also formed with an elongate hole 8e to which a later mentioned linkage member is engaged.

In an internal space of the rotor supporting arm 7, a linkage member 30 is supported for slidable movement in a linear direction. The linkage member 30 is formed at one end thereof with a projecting engagement pin 30a which is to be engaged to the elongate hole 8e formed at the bail supporting member 8. That is, when the bail supporting member 8 is made to rotate between the fishing line releasing position and the fishing line winding position, the linkage member 30 is made to slide linearly through the elongate hole 8e and the engagement pin 30 engaged to the elongate hole 8e.

The linkage member 30 is formed at the other end with a rack 30b, which is in mesh with a gear wheel 32 supported for rotation on the rotor supporting arm 7 by means of a screw 7f. The above mentioned structure ensures the following. When the bail supporting member 8 is made to rotate from the fishing line releasing position (see FIG. 11) to the fishing line winding position, the bail supporting member 8 forcibly returns to the position illustrated in FIG. 10 by a biasing force of a spring (not illustrated) beyond a dead point of the spring. However, since the elongate hole 8e makes engagement with the engagement pin 30a formed on the linkage member 30 while the bail supporting member 8 returns, a force with which the bail supporting member 8 returns is absorbed and relaxed by the mesh between the rack 30b and the gear wheel 32. That is, the bail supporting member 8 is fixed at the fishing line winding position illustrated in FIG. 10 when an end of the elongate hole 8d makes engagement or abutment with the projection 7e of the rotor supporting arm 7 by a biasing force of the spring, however, a force with which the bail supporting member returns to the position is absorbed by the above mentioned mesh between the rack and the gear wheel, and hence no abrupt impact will be generated when the end of the elongate hole 8d (the bail supporting member 8) contacts the projection 7e.

Figure 13:
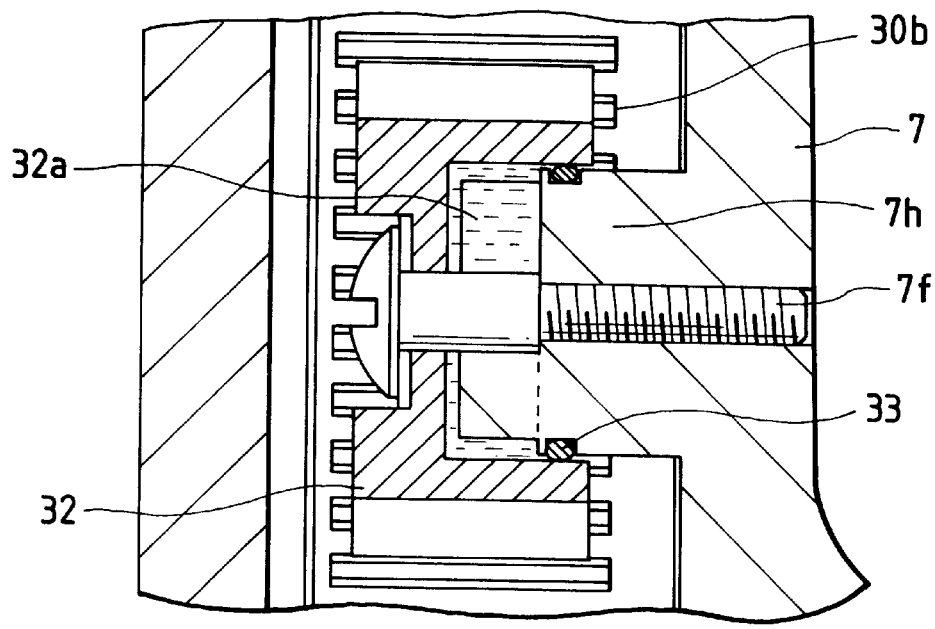
FIG. 13 is an enlarged view of a gist in FIG. 11.
Figure 14:
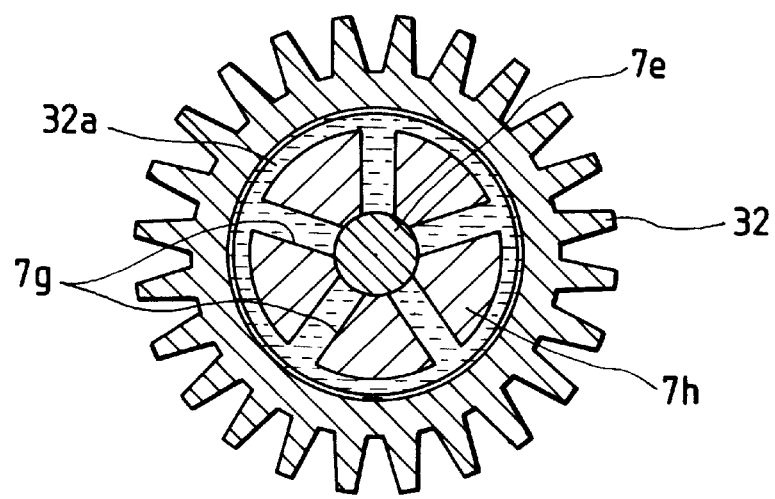
FIG. 14 is a view showing a structure of a gear wheel having highly viscous fluid material.

Absorption of a force with which the bail supporting member 8 returns can be effectively accomplished if a certain load can be given to a rotational force of the gear wheel 32. In the instant embodiment a highly viscous fluid material 32a is sealed between the rotor supporting arm 7 and the gear wheel 32 to receive such a load, as illustrated in FIGS. 13 and 14. More specifically, a cylindrical projection 7h is formed so that the rotor supporting arm 7 can house the gear wheel 32. The projection 7h is circumferentially formed with a plurality of grooves 7g at angular intervals. The highly viscous fluid material 32a is sealed in the grooves through a seal 33.

The gear wheel 32 including the highly viscous fluid material 32a sealed therein ensures that the rotation of the gear wheel 32 caused by the movement of the rack 30b generates a shearing force in the highly viscous fluid material 32a, and hence a force with which the rack 30b moves is effectively absorbed and thus an impact which is generated when the bail supporting member 8 is returned to the fishing line winding position can be effectively absorbed. Of course, the gear wheel 32 may be structured to be supported on the rotor supporting arm 7 with a certain load being exerted thereon.

Though the rack 30b is always in mesh with the gear wheel 32 in the instant embodiment, the rack 30b may be formed anywhere else in order to prevent buffering function from being produced at the fishing line winding position. That is, the rack 30b may be formed on the linkage member 30 so that the rack is in mesh with the gear wheel 32 while the bail supporting member 8 is made to rotate from the fishing line releasing position illustrated in FIG. 15 to a position where the bail supporting member 8 exceeds a dead point of the spring to a certain degree, but is not in mesh with the gear wheel when the bail supporting member is located at the fishing line winding position illustrated in FIG. 16. The above mentioned structure also ensures that a force with which the bail supporting member 8 returns is effectively absorbed, resulting in that there will not be generated an impact when the bail supporting member 8 abuts the projection 7e, and hence it is possible to make the bail supporting member 8 immediately return to the fishing line winding position. Since the rack is not in mesh with the gear wheel at the fishing line winding position, the buffering function does not occur at the fishing line winding position.

Figure 17:
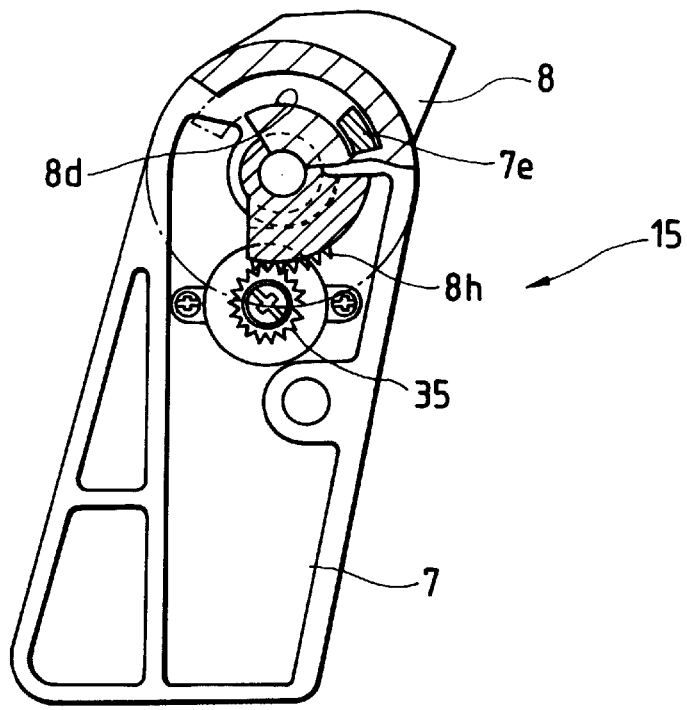
FIG. 17 is a view illustrating a third embodiment in accordance with the present invention, and illustrates that a bail supporting member supported by a rotor supporting arm is located at a fishing line winding position.
Figure 18:
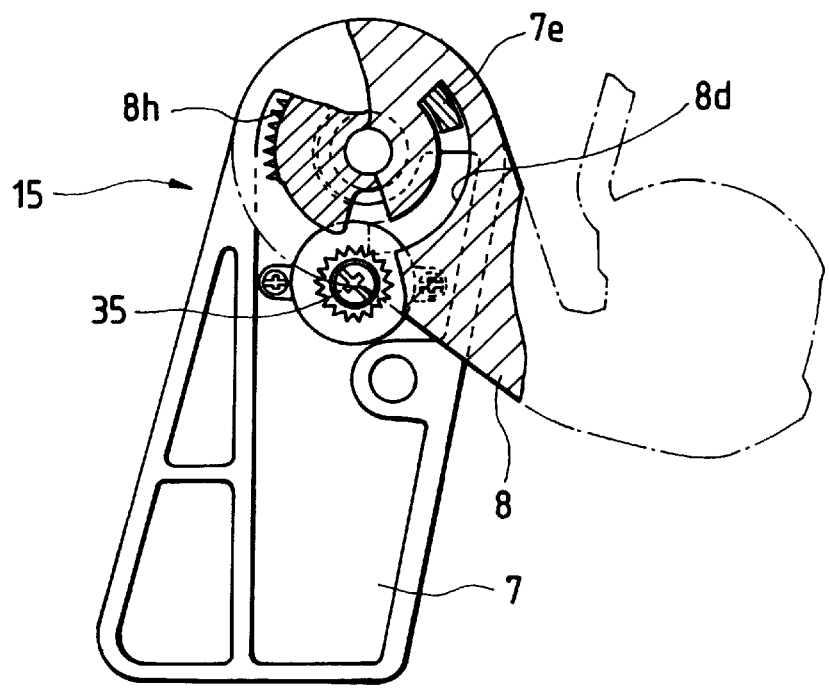
FIG. 18 is a view illustrating that a bail supporting member supported by a rotor supporting arm is located at a fishing line releasing position in a structure illustrated in FIG. 17.

FIGS. 17 and 18 illustrate the third embodiment in accordance with the present invention. Though the buffer means is structured by utilizing the mesh between the rack and the gear wheel in the above mentioned second embodiment, the mesh can be established as follows.

In the third embodiment, a gear wheel 35 having highly viscous fluid material sealed therein and similar to the gear wheel 32 in structure is disposed on the rotor supporting arm 7 in the vicinity of a portion at which the bail supporting member 8 is supported. A gear wheel 8h is provided on a base end of the bail support member 8 so that it can mesh with the gear wheel 35 when the bail support member 8 is rotated.

The above mentioned structure ensures the following. When the bail supporting member 8 is made to rotate from the fishing line releasing position (see FIG. 18) to the fishing line winding position, the bail supporting member 8 forcibly returns to the position illustrated in FIG. 17 by a biasing force of a spring (not illustrated) beyond a dead point of the spring. Since a gear wheel 8 of the bail supporting member 8 is in mesh with the gear wheel 35; while the bail supporting member 8 returns, a force with which the bail supporting member 8 returns is absorbed and relaxed. That is, the bail supporting member 8 is returned to the fishing line winding position illustrated in FIG. 17 when the elongate hole 8d makes engagement with the projection 7e of the rotor supporting arm 7 due to a biasing force of the spring. The force with which the bail supporting member returns to the position is absorbed by the mesh between the gear wheels 8h and 35, and hence there will not be generated an impact when the bail supporting member 8 makes engagement with the projection 7e.

Figure 15:
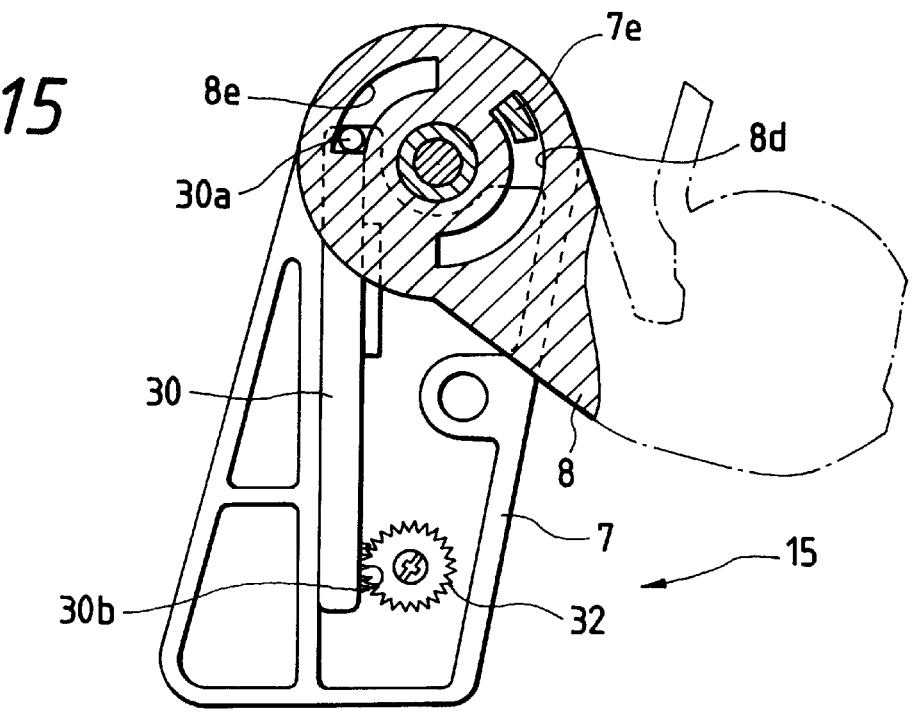
FIG. 15 is a view illustrating a variant of the second embodiment in accordance with the present invention, and illustrates that a bail supporting member supported by a rotor supporting arm is located at a fishing line releasing position.
Figure 16:
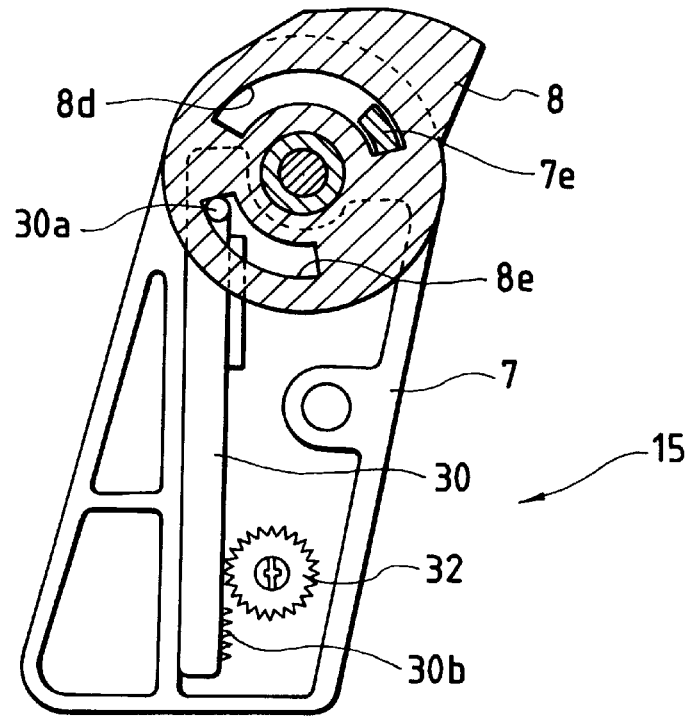
FIG. 16 is a view illustrating that a bail supporting member supported by a rotor supporting arm is located at a fishing line winding position in a structure illustrated in FIG. 15.
Figure 19:
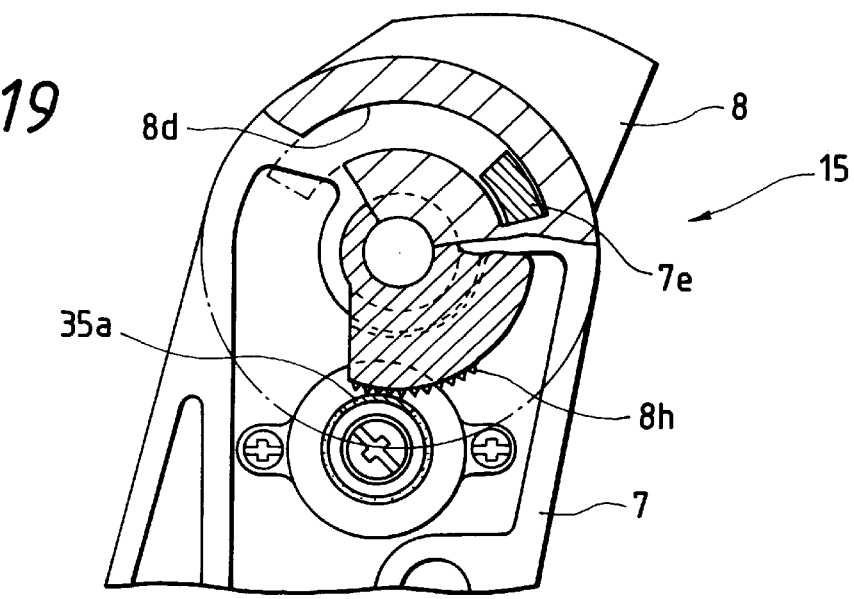
FIG. 19 is a view illustrating a variant of the third embodiment in accordance with the present invention, and illustrates that a bail supporting member supported by a rotor supporting arm is located at a fishing line winding position.
Figure 20:
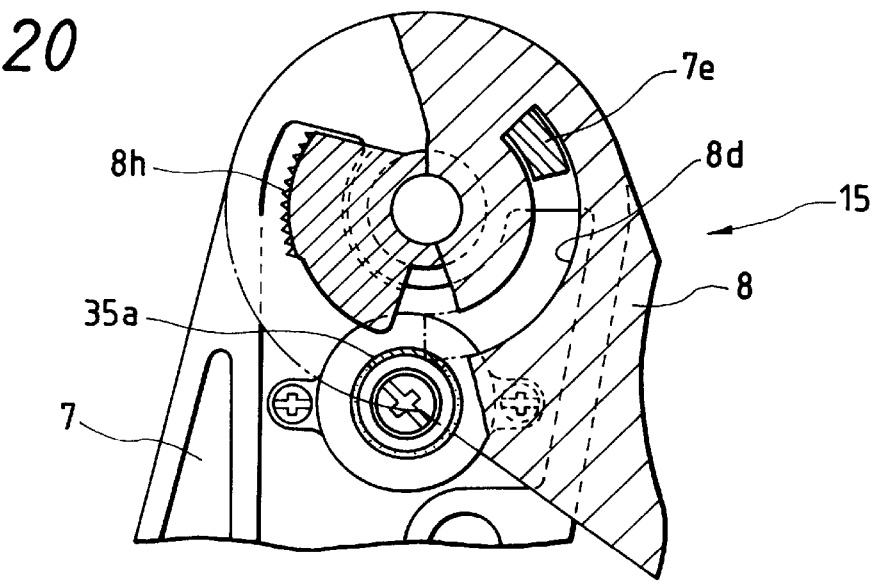
FIG. 20 is a view illustrating that a bail supporting member supported by a rotor supporting arm is located at a fishing line releasing position in a structure illustrated in FIG. 19.

In the instant embodiment, as illustrated in FIG. 17, the gear wheels 8h and 35 are designed to be in mesh with each other at the fishing line winding position; however, the gear wheels may be designed to be not in mesh with each other at the fishing line winding position, as illustrated in FIGS. 15 and 16. The above mentioned mesh between the gear wheels may be replaced with the use of a resilient member 35a such as rubber, as illustrated in FIGS. 19 and 20, so that a force with which the bail supporting member 8 returns is effectively absorbed. The resilient member 35a is to be in mesh with the gear wheel 8h of the bail supporting member 8. Of course, the resilient member may be formed in place of the gear wheel 8h, or the mesh between the gear wheels may be replaced with the engagement of the resilient members.

Figure 21:
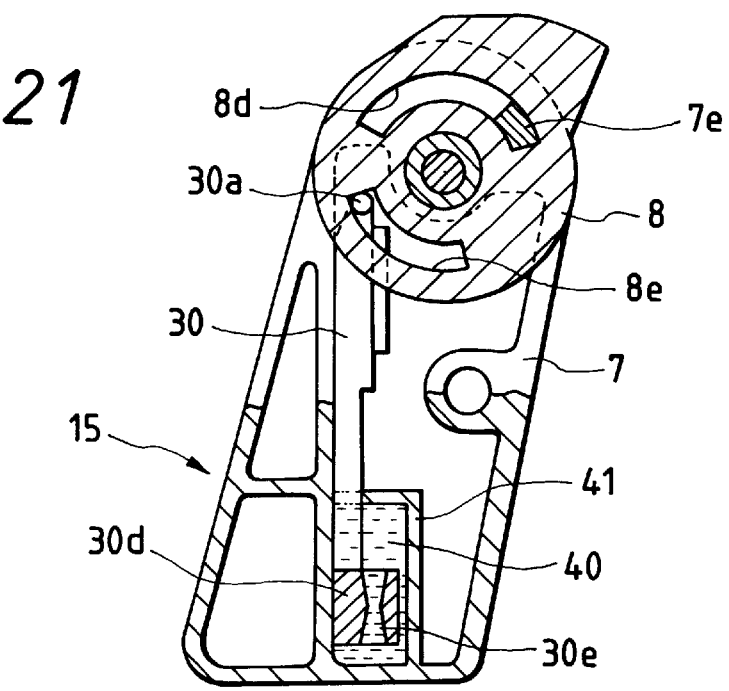
FIG. 21 is a view illustrating a fourth embodiment in accordance with the present invention, and illustrates that a bail supporting member supported by a rotor supporting arm is located at a fishing line winding position.
Figure 22:
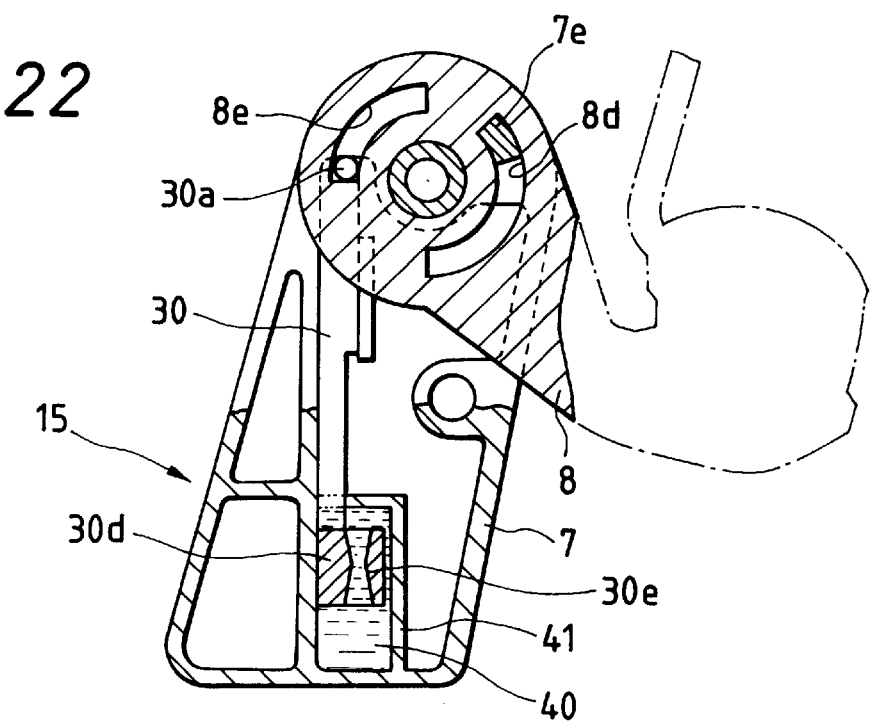
FIG. 22 is a view illustrating that a bail supporting member supported by a rotor supporting arm is located at a fishing line releasing position in a structure illustrated in FIG. 21.

FIGS. 21 and 22 illustrate the fourth embodiment in accordance with the present invention. In the above mentioned second embodiment, the linkage member 30 is formed with a rack which is in mesh with a gear wheel to thereby absorb a force with which the bail supporting member 8 returns to the position, whereas in the instant embodiment, there is formed a chamber 41 in an internal space of the rotor supporting arm 7 and filled with highly viscous fluid material 40. A distal end of the linkage member 30 is inserted into the chamber, and the linkage member is formed with a resistor 30d to thereby provide buffering function to the linkage member 30. The resistor 30 formed at a distal end of the linkage member 30 is formed with a communication valve 30e which is vertically open, in order for the highly viscous fluid material 40 to flow in the chamber 41.

The above mentioned structure ensures that when the bail supporting member 8 returns from the fishing line releasing position illustrated in FIG. 22 to the fishing line winding position illustrated in FIG. 21, the resistor 30d receives a resistive force from the highly viscous fluid material 40, and thus a return force is absorbed. That is, the bail supporting member 8 is fixed accurately at the fishing line winding position illustrated in FIG. 21 by the elongate hole 8d making engagement with the projection 7e of the rotor supporting arm 7 due to a biasing force of the spring. A force with which the bail supporting member returns to the position is absorbed by a resistive force which the resistor 30d receives from the highly viscous fluid material 40, and hence there will not be produced an impact when the bail supporting member 8 makes engagement with the projection 7e.

FIGS. 23 to 26 illustrated the fifth embodiment in accordance with the present invention. A buffer means in the instant embodiment is constructed as follows. The first ends of strings 50a and 50b are fixed to certain positions of the bail supporting member 8 supported on the rotor supporting arm 7 for rotation. A force with which the bail supporting member 8 returns to the fishing line winding position is absorbed in and relaxed by use of the strings 50a and 50b.

Figure 23:
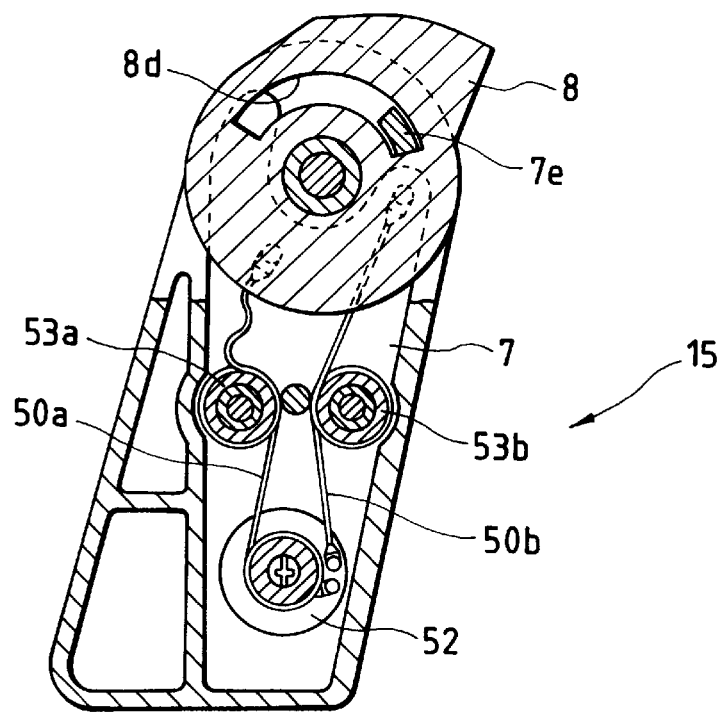
FIG. 23 is a view illustrating a fifth embodiment in accordance with the present invention, and illustrates that a bail supporting member supported by a rotor supporting arm is located at a fishing line winding position.
Figure 24:
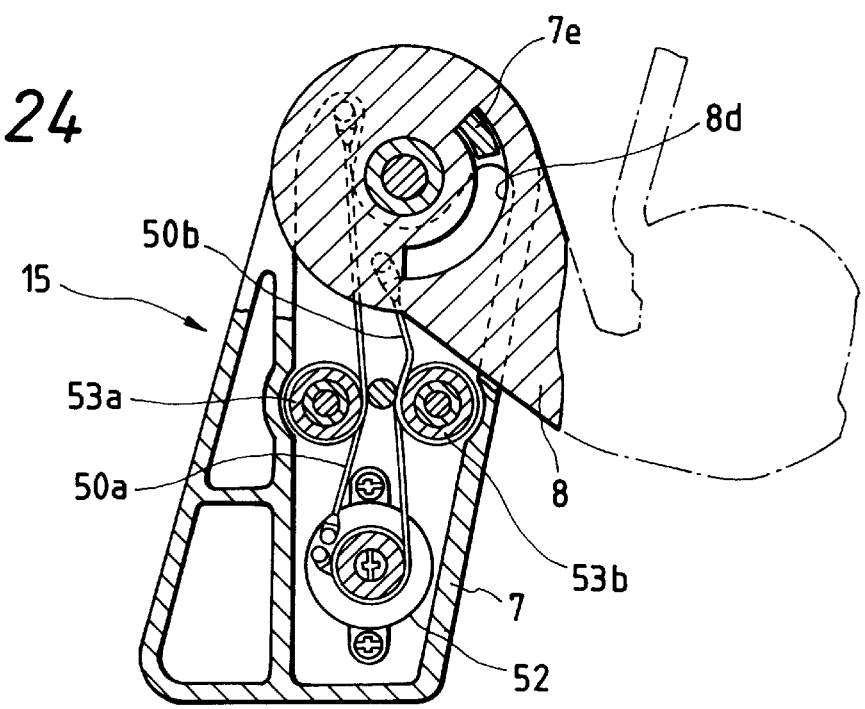
FIG. 24 is a view illustrating that a bail supporting member supported by a rotor supporting arm is located at a fishing line releasing position in a structure illustrated in FIG. 23.

As illustrated in FIGS. 23 and 24, a rotatable member 52 is supported in the rotor supporting arm 7. The second ends of the strings 50a and 50b are fixed to the rotatable member and the strings 50a and 50b can be wound around the rotatable member 52. The relation among the bail supporting member 8, the strings 50a and 50b, and the rotatable member 52 is as follows. The string 50a is wound around the rotatable member 52 when the bail supporting member 8 is located at the fishing line winding position illustrated in FIG. 23. When the bail supporting member 8 is rotated to the fishing line releasing position illustrated in FIG. 24, the string 50a disengages from the rotatable member 52, and instead the string 50b is wound around the rotatable member 52. Thus, the rotatable member 52 is made to rotate through the strings 50a and 50b while the bail supporting member 8 is rotating. Between the bail supporting member 8 and the rotatable member 52, there are supported tension pulleys 53a and 53b for rotation for providing tension to the strings 50a and 50b.

Figure 25:
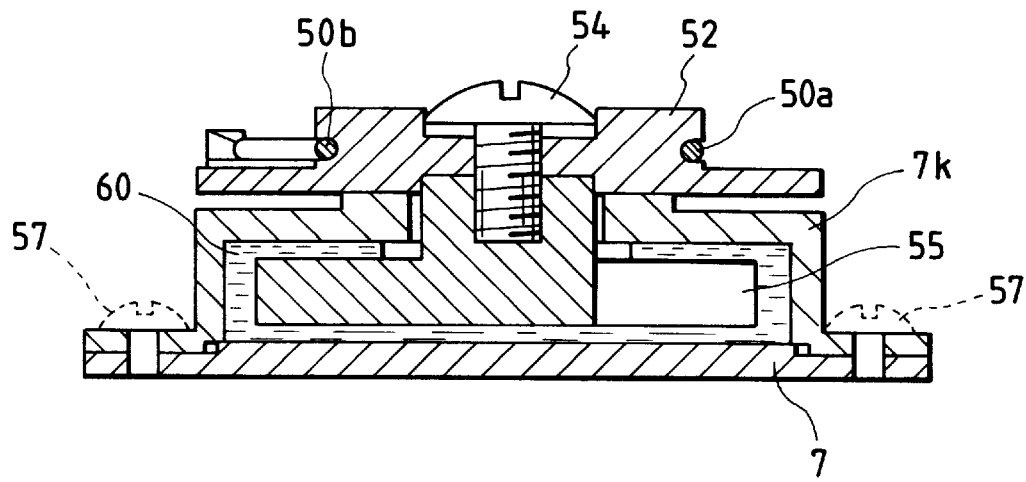
FIG. 25 is a view illustrating a structure of a rotatable member in a structure illustrated in FIG. 23.
Figure 26:
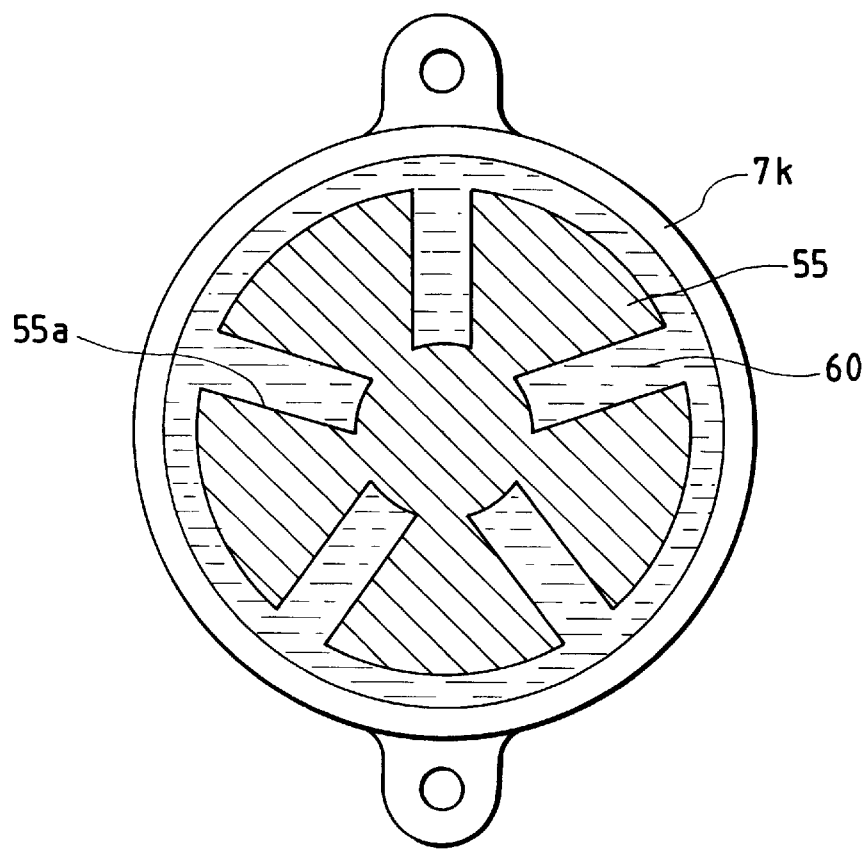
FIG. 26 is a view illustrating a structure of a fan integrally formed with a rotatable member illustrated in FIG. 25.

The rotatable member 52 holds a fan 55 through a screw 54 so that the fan 55 can rotate together with the rotatable member, as illustrated in FIG. 25. As illustrated in FIG. 26, the fan 55 is circular in shape, and is formed with a plurality of radially extending recesses 55a provided at angular intervals in a circumferential direction. The fan 55 is sealingly contained in a chamber 7k formed at a surface of the rotor supporting arm 7 through a screw 57. The chamber 7k is filled with highly viscous fluid material 60, so that when the fan 55 is made to rotate by the rotation of the bail supporting member 8 through the strings 50a and 50b, a resistive force is imparted to the rotation of the fan 55.

The above mentioned structure ensures that when the bail supporting member 8 returns from the fishing line releasing position illustrated in FIG. 24 to the fishing line winding position illustrated in FIG. 23, the fan 55 rotating together with the rotatable member 52 receives a resistive force from the highly viscous fluid material 60, and thus a return force is absorbed. That is, the bail supporting member 8 is fixed accurately at the fishing line winding position illustrated in FIG. 23 by the elongate hole 8d making engagement with the projection 7e of the rotor supporting arm 7 due to a biasing force of the spring. A force with which the bail supporting member returns to the position is absorbed by a resistive force which the fan 55 receives from the highly viscous fluid material 60, and hence no appreciable impact will be produced when the bail supporting member 8 makes engagement with the projection 7e.

As explained earlier, a characteristic of the present invention is that when the bail supporting member returns from a fishing line releasing position to a fishing line winding position, a return force caused by a biasing force of a spring is absorbed and relaxed by a buffer means. A location where the buffer means is to be disposed and a structure by which a return force is absorbed and relaxed near a fishing line winding position are not to be limited to the above mentioned embodiments, but may be varied.

Though a gear wheel, as a buffer means, utilizing a shearing force of highly viscous fluid material absorbs and relaxes an impact generated when the bail supporting member returns in several of the above embodiments, alternatively or additionally, a braking gear wheel making rotatable and frictional engagement with the rotor supporting arm by compressing a braking plate thereto may be engaged to the bail supporting member.

In accordance with the inventive spinning reel used for fishing, when the bail supporting member returns from a fishing line releasing position to a fishing line winding position, a return force caused by a biasing force of a spring is absorbed and relaxed by a buffer means, so that an impact noise is prevented from being generated. In addition, because there is no biasing force against a return force caused by a biasing force of a spring, a fishing line winding position (angle) of the bail supporting member, that is, a position (angle) of the fishing line guide can be kept stable, so that a fishing line path is stable, preventing exerting a harmful influence on fishing line wound condition, fishing line twisting, fishing line jam and rotor rotation balance.

What is claimed is:

1. A spinning reel used for fishing including a rotor rotatable in accordance with rotation of a handle, said rotor supporting a bail supporting member having a fishing line guide so that said bail supporting member is able to swing between a fishing line winding position and a fishing line releasing position, said bail supporting member being biased by a spring member holding said bail supporting member at each of said fishing line winding position and said fishing line releasing position, wherein said bail supporting member engages with buffer means before said bail supporting member is returned from said fishing line releasing position to said fishing line winding position to thereby absorb and relax a backward return force produced when said bail supporting member is returned to said fishing line winding position, wherein said buffer means includes highly viscous fluid material absorbing and relaxing the backward return force, and wherein said highly viscous fluid material absorbs said backward return force only during a latter portion of a movement of said bail supporting member when said bail supporting member is returned from said fishing line releasing position to said fishing line winding position.

2. A spinning reel used for fishing as set forth in claim 1, wherein said highly viscous fluid material is brought into engagement with said bail supporting member while said bail supporting member returns from said fishing line releasing position to said fishing line winding position.

3. A spinning reel used for fishing as set forth in claim 2, wherein said buffer means comprises a gear wheel which meshes with a member that moves in association with movement of said bail supporting member to said fishing line winding position.

4. A spinning reel used for fishing as set forth in claim 2, wherein said buffer means comprises a rotatable member which engages a member that moves in association with movement of said bail supporting member to said fishing line winding position.

5. A spinning reel used for fishing comprising:

a rotor rotatable in accordance with rotation of a handle and having a rotor support arm;

a bail supporting member having a fishing line guide, said bail supporting member being supported on said rotor support arm so that said bail supporting member is able to swing between a fishing line winding position and a fishing line releasing position;

a dead-point spring for biasing and holding said bail supporting member at either of said fishing line winding position and said fishing line releasing position with the aid of dead-point action; and buffer means, disposed between said rotor support arm and said bail supporting member, for absorbing a backward return force exerted on said bail supporting member and providing resistive force to said bail supporting member when said bail supporting member is rotatingly returned from said fishing line releasing position to said fishing line winding position, wherein said buffer means includes highly viscous fluid material that absorbs said backward return force and provides said resistive force, and wherein said backward return force is absorbed only during a latter portion of a rotation of said bail supporting member when said bail supporting member is returned from said fishing line releasing position to said fishing line winding position.

6. A spinning reel used for fishing as claimed in claim 5, wherein said buffer means comprises a rotatable member that engages an engaging member that moves in accordance with movement of said bail supporting member.

7. A spinning reel used for fishing as claimed in claim 6, wherein said rotatable member disengages said engaging member after said dead-point spring passes between said fishing line releasing position and a dead point position.

8. A spinning reel used for fishing as claimed in claim 6, wherein at least one of said rotatable member and said engaging member is formed of a resilient material.

9. A spinning reel used for fishing as claimed in claim 5, wherein said buffer means comprises a gear wheel that meshes with an engaging member that moves in accordance with movement of said bail supporting member.

10. A spinning reel used for fishing as claimed in claim 9, wherein said gear wheel disengages said engaging member after said dead-point spring passes between said fishing line releasing position and a dead point position.

11. A spinning reel used for fishing comprising:
   a handle;
   a rotor having a rotor support arm and being rotatable in accordance with a rotation of said handle;
   a bail supporting member rotatably supported on said rotor support arm so that said bail supporting member is able to move a bail between a fishing line winding position and a fishing line releasing position;
   an engagement member that is operatively coupled to said bail supporting member and moves in a first engagement member direction when said bail supporting member is moving said bail towards said fishing line releasing position and moves second engagement member direction when said bail supporting member is moving said bail towards said fishing line winding position; and
   a viscous liquid friction member that is operatively coupled to said engagement member and that moves in a first friction direction against friction created by a viscous liquid when said engagement member moves in said first engagement member direction and moves in a second friction direction against said friction created by said viscous liquid when said engagement member moves in said second engagement friction direction.

12. The spinning reel as claimed in claim 11, wherein said bail supporting member contains a first recess having a first end stopper and a second end stopper,
   wherein said engagement member contains a projection slidably disposed within said first recess,
   wherein said first recess moves when said bail supporting member moves said bail towards said fishing line releasing position such that said first end stopper abuts against and moves said projection such that said engagement member moves in said first engagement member direction, and
   wherein said first recess moves when said bail supporting member moves said bail towards said fishing line winding position such that said second end stopper abuts against and moves said projection such that said engagement member moves in said second engagement member direction.

13. The spinning reel as claimed in claim 12, wherein said viscous liquid friction member rotates around a shaft in said first friction direction when said engagement member moves in said first engagement member direction and rotates around said shaft in said second friction direction when said engagement member moves in said second engagement friction direction.

14. The spinning reel as claimed in claim 13, wherein said viscous liquid friction member contains teeth and rotates when the teeth engage a rack disposed on said engagement member.

15. The spinning reel as claimed in claim 14, wherein said teeth of said viscous liquid friction member do not engage said teeth of said rack disposed on said engagement member during a latter portion of a movement of said bail towards said fishing line releasing position.

16. The spinning reel as claimed in claim 13, wherein said viscous liquid friction member contains a frictional outer surface and rotates when a frictional surface of said engagement member moves against said frictional outer surface.

17. The spinning reel as claimed in claim 13, wherein said viscous liquid is provided between at least a portion of said shaft and said viscous liquid friction member and provides friction when said viscous liquid member rotates around said shaft.

18. The spinning reel as claimed in claim 17, wherein said bail supporting member contains a second recess having a first end and a second end and said rotor support arm comprises an abutment projection that is slidably disposed in said second recess, and
   wherein said first end of said second recess abuts against said abutment projection when said bail is in said fishing line releasing position and wherein said second end of said second recess abuts against said abutment projection when said bail is in said fishing line winding position.

19. The spinning reel as claimed in claim 11, wherein said engagement member rotates in unison with said bail supporting member and rotates in said first engagement member direction when said bail supporting member is moving said bail towards said fishing line releasing position and moves in said second engagement member direction when said bail supporting member is moving said bail towards said fishing line winding position.

20. The spinning reel as claimed in claim 19, wherein said viscous liquid friction member rotates in said first friction direction against friction when said engagement member rotates in said first engagement member direction and rotate in said second friction direction when said engagement member rotates in said second engagement friction direction.

21. The spinning reel as claimed in claim 20, wherein said first engagement member direction is opposite to said first friction direction and said second engagement member direction is opposite to said second friction direction.

22. The spinning reel as claimed in claim 20, wherein said engagement member at least indirectly rotates said viscous liquid friction member via a gear network.

23. The spinning reel as claimed in claim 22, wherein an outer surface of said engagement member contains teeth that engage teeth located on an outer surface of said viscous liquid friction member so that said viscous liquid friction member rotates when said engagement member rotates.

24. The spinning reel as claimed in claim 20, wherein said engagement member at least indirectly rotates said viscous liquid friction member via frictional contact.

25. The spinning reel as claimed in claim 24, wherein said engagement member contains a frictional outer surface that engages a frictional outer surface of said viscous liquid friction member so that said viscous liquid friction member rotates when said engagement member rotates.

26. The spinning reel as claimed in claim 20, wherein said viscous liquid friction member rotates around a shaft in said first friction direction when said engagement member moves in said first engagement member direction and rotates around said shaft in said second friction direction when said engagement member moves in said second engagement friction direction, and wherein said viscous liquid is provided between at least a portion of said shaft and said viscous liquid friction member and provides friction when said viscous liquid member rotates around said shaft.

27. The spinning reel as claimed in claim 11, wherein said viscous liquid friction member comprises a valve which travels in said first friction direction through said viscous liquid when said engagement member moves in said first engagement member direction and travels in said second friction direction through said viscous liquid when said engagement member moves in said second engagement member direction.

28. The spinning reel as claimed in claim 27, wherein said valve has a hollow interior that is substantially aligned which said first and second friction directions, wherein a cross sectional area of said hollow interior is smaller at a middle portion of said hollow interior than at an end portion of said hollow interior, and wherein said viscous liquid is disposed in said hollow interior.

29. The spinning reel as claimed in claim 28, wherein said hollow interior is substantially hour-glass shaped.

30. The spinning reel as claimed in claim 11, wherein said viscous liquid friction member has a disk-shaped portion and said engagement member comprises a flexible line member, wherein said flexible line member has a first end and a second end that are connected to said bail supporting member and wraps around said disk-shaped portion of said viscous liquid friction member, wherein said flexible line member travels in said first engagement member direction when bail supporting member moves said bail towards said fishing line releasing position to rotate said disk-shaped portion in said first friction direction and travels in said second engagement member direction when bail supporting member moves said bail towards said fishing line winding position to rotate said disk-shaped portion in said second friction direction.

31. The spinning reel as claimed in claim 30, wherein said flexible line member comprises:

a first segment having said first end and a first intermediate end, wherein said first intermediate end is connected to a said viscous liquid friction element such that a portion of said first segment wraps around said disk-shaped portion when viscous liquid element rotates in said second friction direction, and a second segment having said second end and a second intermediate end, wherein said second intermediate end is connected to a said viscous liquid friction element such that a portion of said second segment wraps around said disk-shaped portion when viscous liquid element rotates in said first friction direction.

32. The spinning reel as claimed in claim 30, wherein said viscous liquid friction member rotates around a shaft in said first friction direction when said engagement member moves in said first engagement member direction and rotates around said shaft in said second friction direction when said engagement member moves in said second engagement friction direction, and wherein said viscous liquid is provided between at least a portion of said shaft and said viscous liquid friction member and provides friction when said viscous liquid member rotates around said shaft.

\* \* \* \* \*